US005895993A

United States Patent [19]

Kajino et al.

[11] Patent Number: 5,895,993

[45] Date of Patent: Apr. 20, 1999

[54] STARTER WITH IMPROVED PINION DRIVE AND RETURN STRUCTURE

[75] Inventors: Sadayoshi Kajino, Nagoya; Masahiro Soh, Anjo; Nobuyuki Hayashi, Nagoya, all of Japan

[73] Assignee: Denso Corporation, Japan

[21] Appl. No.: 08/864,965

[22] Filed: May 29, 1997

Related U.S. Application Data

[63] Continuation-in-part of application No. 08/768,854, Dec. 17, 1996, abandoned.

[30] Foreign Application Priority Data

| | | | |
|---|---|---|---|
| Dec. 19, 1995 | [JP] | Japan | 7-330862 |
| Jul. 16, 1996 | [JP] | Japan | 8-185680 |

[51] Int. Cl.[6] ..... H02K 7/06; H02K 7/10; F02N 11/00; F02N 11/02

[52] U.S. Cl. ..... 310/83; 74/7

[58] Field of Search ..... 310/83; 290/38 A, 290/38 R, 48; 74/6, 7 R, 7 A, 7 C, 7 D, 7 E

[56] References Cited

U.S. PATENT DOCUMENTS

| | | | |
|---|---|---|---|
| 2,787,910 | 4/1957 | Sabatini | 74/7 |
| 2,996,924 | 8/1961 | Sabatini | 74/7 |
| 3,232,123 | 2/1966 | Wheatley | 74/7 |
| 3,399,576 | 9/1968 | Seilly et al. | 74/7 |
| 4,488,054 | 12/1984 | Ebihara | 290/38 A |
| 4,590,811 | 5/1986 | Kasubuchi | 74/7 E |
| 4,738,148 | 4/1988 | Norton | 74/7 R |
| 4,895,234 | 1/1990 | Fujino | 192/42 |
| 4,931,663 | 6/1990 | Morishita et al. | 290/48 |
| 4,958,097 | 9/1990 | Woodward et al. | 310/83 |
| 5,265,485 | 11/1993 | Sakamoto et al. | 74/7 E |
| 5,443,553 | 8/1995 | Shiga et al. | 74/7 R |

FOREIGN PATENT DOCUMENTS 51-52647 12/1976 Japan .

OTHER PUBLICATIONS

Patent Abstracts of Japan, vol. 008, No. 020, (M-271), Jan. 27, 1984, & JP 58 178865 A, Oct. 19, 1983.

Patent Abstracts of Japan, vol. 008, No. 020 (M-271), Jan. 27, 1984 & JP 58 178867 A (Nippon Denso KK), Oct. 19, 1983.

Patent abstracts of Japan, vol. 010, No. 331 (M-553), Nov. 11, 1986, & JP 61 135983 A (Hitachi Ltd), Jun. 23, 1986.

*Primary Examiner*—Clayton LaBalle
*Attorney, Agent, or Firm*—Pillsbury Madison & Sutro, LLP

[57] ABSTRACT

A pinion moving member on an output shaft is pushed forward by a pinion pushing member such as a lever which is driven by a plunger of an electromagnet switch. After a pinion gear of the pinion moving member abuts a ring gear, reaction force is stored in a spring as the plunger of the electromagnet switch moves further. When the pinion gear comes into meshing engagement with the ring gear by the reaction force of the spring, a retreat restricting member restricts retreat of the pinion moving member. The retreat restricting member are provided separately from the pinion pushing member so that the the pinion pushing member driven by the electromagnet switch need not restrict the retreat of the pinion moving member.

8 Claims, 5 Drawing Sheets

STARTER WITH IMPROVED PINION DRIVE AND RETURN STRUCTURE

CROSS REFERENCE TO RELATED APPLICATION

This is a continuation-in-part application of a patent application Ser. No. 08/768,854 filed on Dec. 17, 1996 now abandoned.

BACKGROUND OF THE INVENTION

1. Field of the Invention

The present invention relates to a starter which starts an engine and, more particularly, to a starter which has a pinion pushing structure and a pinion retreat restricting structure separately for assuring engagement of a pinion gear with an engine ring gear.

2. Description of Related Art

A starter is known as disclosed in Japanese Utility Model Examined Publication No. 51-52647.

This starter is provided with a tube that is fitted on the outer periphery of an armature rotary shaft through a helical spline and a drive ring that is fitted slidably over the outer periphery of this tube. When a pinion gear has meshed with a ring gear, a ball received in the tube fits in a recess formed in an output shaft. The drive ring regulates the outer periphery of this ball and thereby restricts the ball from being drawn off from the recess, whereby it is possible to restrict the retreat of the pinion. On the other hand, after the engine is started, the drive ring moves on and along the outer periphery of the tube and as a result ceases to regulate the ball, with the result that the ball having been regulated is drawn off from the recess due to the centrifugal force to thereby enable the retreat of the pinion gear.

However, in this starter, since a one-way clutch is interposed between the tube receiving the ball therein and the pinion gear, even when the pinion gear is rotated at high speeds by the ring gear after the start of the engine, the rotation of the pinion gear is not transmitted to the tube and the tube is rotated in synchronism with the rotary shaft. That is, since the rotation of the tube is small compared to the rotation of the pinion gear, the centrifugal force that acts on the ball is also small, with the result that the ball becomes unlikely to get off from the recess, whereby insufficient return of the pinion gear occurs.

Another conventional starter is known as disclosed in Japanese Patent Unexamined publication No. 58-178865. In this starter, a pinion gear and a one-way clutch are separated so that only the pinion gear may move along an output shaft. This starter is so constructed that, after the pinion gear is moved to the side end of a ring gear by the operational force (attraction force) of an electromagnet switch, the pinion gear is engaged with the ring gear by the reaction force stored in an engagement biasing spring force. This construction greatly reduces a mass weight of a moving member which is moved by the electromagnet switch and the engagement biasing spring, in comparison with a starter having the construction in which a pinion gear and a one-way clutch are moved together. As a result, the loading to the engagement biasing spring and the attraction force of the electromagnet switch can be reduced, thus advantageously reducing the electromagnet switch in size. Particularly in a reduction type starter in which the rotation of an electric motor is speed-reduced to be transmitted to an output shaft, the loading to an engagement biasing spring can be reduced more greatly because the pinion gear starts to rotate slowly.

In the starter so constructed that the pinion gear and the one-way clutch are separated to move only the pinion along the output shaft, however, pinion gear retreating force will exert on the teeth of helical splines formed respectively on the inner periphery of the pinion gear and the outer periphery of the output shaft when the ring gear rotation speed exceeds the pinion gear rotation speed due to rotation speed variations caused at the time of driving the engine. The loading onto the engagement biasing spring restricts the retreat of the pinion gear. Therefore, with the loading of the engagement biasing spring being smaller than the retreat force exerting on the pinion gear, the engagement of the pinion gear with the engine ring gear is released before the engine starts combustion thus causing misfires.

Even though the loading on the engagement biasing spring can be reduced to reduce the electromagnet switch in size, the reduction in the loading on the engagement biasing spring is limited due to necessity for restricting the retreat of the pinion gear. Thus, great advantage cannot be provided in the reduction in size of the electromagnet switch.

SUMMARY OF THE INVENTION

The present invention has an object to provide a starter which obviates the foregoing drawbacks of the conventional starter.

The present invention has another object to provide a starter which has a structure for restricting the insufficient return of a pinion gear after an engine start.

The present invention has a further object to provide a starter in which loading onto a spring for producing biasing force to engage a pinion gear with a ring gear can be reduced so that an electromagnet switch may be reduced in size.

According to one aspect of the present invention, a starter is provided with a pinion pushing member and a pinion retreat restricting member separately. At least the pinion pushing member is driven by an electromagnet switch for pushing forward a pinion for meshing engagement with an engine ring gear. The pinion retreat restricting member is constructed to restrict retreat of the pinion after meshing engagement with the ring gear without requiring the pinion pushing member to restrict the pinion from retreating.

According to another aspect of the present invention, a starter is so constructed that, when a hollow cylindrical member of a pinion moving member is moved by a prescribed distance and as a result a pinion gear meshes with an engine ring gear, an engagement member engaged with a retaining portion formed on an output shaft is retained by the hollow cylindrical member that rotates integrally with the pinion gear. When the pinion gear is rotated at high speeds by the ring gear after the engine is started, the hollow cylindrical member also rotates at high speeds integrally with the pinion gear. Thus, when the regulation of the engagement member by a regulation member is released, the centrifugal force that occurs due to the high speed rotation of the hollow cylindrical member acts on the engagement member, with the result that the engagement member can reliably be disengaged from a retaining portion. As a result of this, after the start of the engine, the pinion gear can retreat on the output shaft along a helical spline and return to its rest position.

Preferably, a stepped portion extends from a large diameter portion on the output shaft to a small diameter portion thereon. Thus, the necessity of forming a recess in the output shaft in which the engagement member fits as in the prior art is eliminated.

Preferably, the pinion moving member is structurally arranged to move through a ball bearing, relative rotations occur between an inner and an outer rings when the hollow cylindrical member rotates jointly with the pinion gear. That is, even when the inner ring fitted over the outer periphery of the hollow cylindrical member rotates at high speeds after the engine is started, the outer ring can stay at rest, with the result that no slide friction occurs between the outer ring and a pinion driving lever. Thus, the lever is required merely to have only a rigidity high enough to advance and retreat the pinion through the ball bearing.

According to a further aspect of the present invention, in a starter in which reaction force stored in a spring is transmitted to a pinion pushing member to engage a pinion gear with a ring gear when rotating force of an electric starting motor is transmitted to an output shaft and the pinion gear rotates to a position where the pinion gear engages the ring gear, a pinion retreat restricting member is provided for restricting in cooperation with a plunger the pinion gear from retreating after the meshing engagement of the pinion gear with the ring gear. Thus, even when retreating force exerts on the pinion gear due to rotation speed variations caused at the time of driving an engine, the pinion gear can be restricted from retreating by the pinion retreat restricting member. That is, because the pinion pushing member on which the reaction force of the spring exerts is not required to restrict the retreat of the pinion gear, the spring loading can be reduced greatly and the electromagnet switch can be reduced in size in comparison with a conventional starter in which retreat of a pinion gear is restricted by loading to an engagement biasing spring.

Preferably, the starter is provided further with a speed reduction mechanism for reducing rotation of the electric starting motor to transmit the same to the output shaft. Thus, in comparison with a starter having no reduction mechanism, the pinion gear starts to rotate slowly and the loading of the spring can be reduced more.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF PRESENTLY PREFERRED EMBODIMENTS

Figure 1:
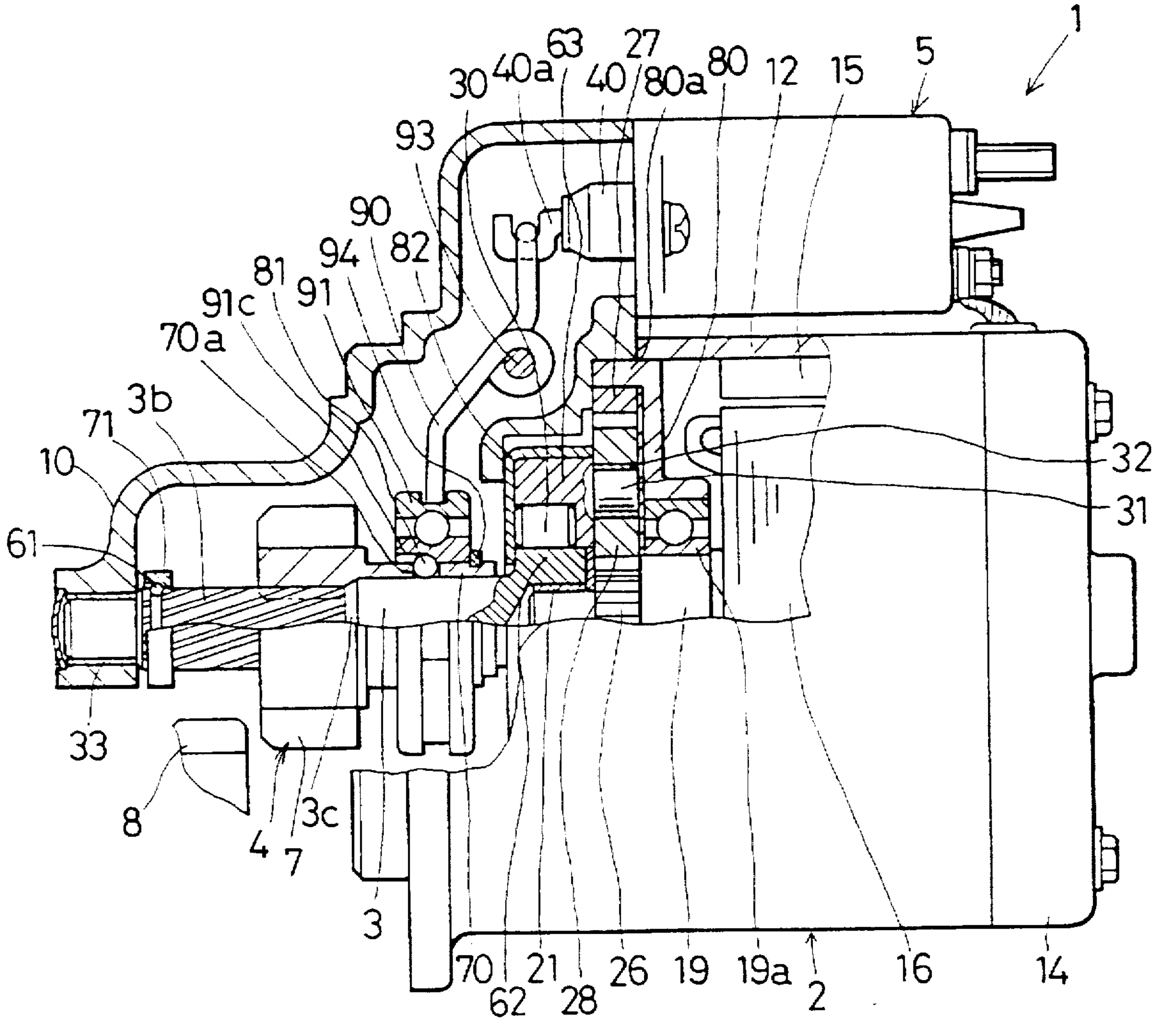
FIG. 1 is a side view illustrating, partly in cross section, a starter according to the first embodiment of the present invention.

The present invention will be described with reference to two embodiments in which the same or similar parts are designated by the same reference numerals.

First Embodiment

A starter 1 is composed of, as shown in FIG. 1, an electric starting motor 2 that generates a rotating force upon receipt of electric power, an output shaft 3 that rotates upon receipt of the rotating force of the motor 2, a pinion moving member 4 that is fitted onto an outer periphery of the output shaft 3 through a helical spline 3*b*, a planetary gear reduction mechanism (described later) for reducing the rotating speed of the motor 2 to cause an increase in the rotating torque, a one-way clutch (described later) for transmitting to the pinion 3 the rotating force of the motor 2 that has been transmitted thereto through the planetary gear reduction mechanism, pinion driving member (described later) for moving the pinion moving member 4 toward a ring gear 8 of the engine, etc.

The motor 2 is composed of an armature 16 that rotates integrally with an armature rotary shaft 19, fixed magnetic poles (e.g., permanent magnets) 15 that are disposed around this armature 16, a cylindrical yoke 12 that fixes the fixed magnetic poles 15 to an inner peripheral surface thereof, etc. The rotary shaft 19 is rotatably supported on a forward end side of the armature 16 by a supporting member 80 through a ball bearing 19*a* and is rotatably supported on a rearward end side of the armature 16 by a rear casing 14 through a bearing not illustrated. It is to be noted that the supporting member 80 is provided as a partitioning wall for making a partition between the motor 2 and the planetary gear reduction mechanism and a cylindrical extended wall portion 80*a* that is formed on the outer periphery thereof is supported by inner peripheral surfaces of a front casing 10 and the yoke 12.

The output shaft 3 is disposed on the same axis as that of the rotary shaft 19 and a forward end portion thereof is rotatably supported by the front casing 10 through a bearing 33 while, on the other hand, a rearward end portion thereof rotatably supports through a bearing 28 a forward end of the rotary shaft 19 in a recess that is formed in a central part of the end face thereof. This output shaft 3 is formed such that a forward side thereof, as viewed in the axial direction thereof, where the helical spline 3*b* is formed is formed to be smaller in diameter than a rearward side thereof and thereby has a tapered stepped wall surface 3*c* that extends from a terminal end of the helical spline 3*b* to the outer peripheral surface of the rearward side thereof.

The pinion moving member 4 has integrally provided on the side of a rear end thereof a hollow cylindrical member 70 that is fitted over the outer peripheral surface of the rearward side of the output shaft 3 and is so provided as to be axially movable, along with the hollow cylindrical member 70, on the output shaft 3 along the helical spline 3*b* of the output shaft 3. However, the advance or forward movement of the pinion moving member 4 is regulated by abutting against a stop collar 71 that is fixed through a snap ring 61 onto the outer periphery of the forward end side of the output shaft 3. Also, the retreat movement of the pinion moving member 4 is regulated by a tapered stepped portion 3*c* between an inner peripheral surface of the pinion moving member 4 and an inner peripheral surface of the hollow cylindrical member 70 abutting against the stepped wall surface 3*c* of the output shaft 3 (a state illustrated in FIG. 1).

The hollow cylindrical member 70 has openings (that may be one in number) 70*a* formed at a plurality of circumferential positions thereof in such a manner that these openings pass through a wall surface thereof, a ball 81 being received in each of the openings 70*a*. The ball 81 has a diameter that is larger than the thickness of the wall surface of the hollow cylindrical member 70 and is received in the opening 70*a* in a state of being movable radially of the hollow cylindrical member 70. It is to be noted that the opening 70*a* that receives the ball 81 therein is formed at a position (hereinafter referred to as "the terminal end portion of the helical spline 3*b*") where when the pinion moving member 4 advances and abuts against the stop collar 71, i.e., when the pinion moving member 4 has meshed with the ring gear 8 the ball 81 drops from the outer peripheral surface of the rearward side of the output shaft 3 to the outer peripheral surface of the forward side of the output shaft 3 and thereby abuts against the stepped wall surface 3*c* of the output shaft 3. Also, the provision of the opening 70*a* is made so that, at this time, that is, when the ball 81 has dropped into the terminal end portion of the helical spline 3*b*, the ball 81 may be restricted from being drawn off from the outer peripheral surface of the hollow cylindrical member 70 and so that a ball bearing 91 as described later may be slid on the outer peripheral surface of the hollow cylindrical member 70. The planetary gear reduction mechanism is composed of a sun gear 26 that is formed on the outer periphery of a forward end of the rotary shaft 19, a plurality of planetary gears 28 (e.g., three pieces) that mesh with this sun gear 26, and an internal gear 27 that meshes with each of the planetary gears 28.

The sun gear 26 rotates integrally with the rotary shaft 19 to thereby transmit the rotation thereof to each planetary gear 28. Each planetary gear 28 is rotatably supported by a corresponding pin 31 through a bearing 32 and revolves around an outer periphery of the sun gear 26 while being meshed with both the sun gear 26 and the internal gear 27. The internal gear 27 is fixed, for example, by press-fitting, to the inner peripheral surface of an extended wall portion 80*a* that is provided on the outer periphery of the supporting member 80 to thereby enable the revolution of each planetary gear 28.

The one-way clutch is composed of a clutch outer member 63, clutch inner member 62, clutch rollers 30, clutch cover 82, etc. The clutch outer member 63 is provided integrally with the pins 31 and, when the revolving force of each planetary gear 28 has been transmitted thereto through the pins 31, rotates jointly with each planetary gear 28. The clutch inner member 62 is one which has been provided by the rearward end portion of the output shaft 3 being radially enlarged, and is caused to rotate by the rotating force of the clutch outer member 63 being transmitted thereto through the clutch rollers 30 at the time of the torque transmission. It is to be noted that the clutch outer member 63 and the pins 31 may be provided separately from each other, after which the pin 31 is forcedly inserted into and fixed to the clutch outer member 63 or the both members are bonded together.

In this one-way clutch, when the revolving force of each planetary gear 28 is transmitted to the clutch outer member 63 through the pins 31, the clutch rollers 30 connect the clutch outer member 63 and the clutch inner member 62, whereby the rotating force of the clutch outer member 63 is transmitted to the clutch inner member 62. This enables the transmission of the rotating force of the motor 2 to the output shaft 3. On the other hand, when the pinion moving member 4 rotates at high speeds by receiving the rotating force of the engine through the ring gear 8 after the start of the engine, the rotation speed of the clutch inner member 62 becomes higher than the rotation speed of the clutch outer member 63, with the result that the clutch rollers 30 disconnect the clutch outer member 63 and the clutch inner member 62. As a result, the rotation of the clutch inner member 62 is restricted from being transmitted to the clutch outer member 63. This enables the restriction of the overrun of the armature 16.

The pinion driving mechanism is composed of an electromagnet switch 5, a lever 90 and the ball bearing 91.

The electromagnet switch 5 is provided with an attraction coil (not illustrated) that generates a magnetic force upon receipt of electric current and a plunger 40 that is disposed in the hollow interior of the coil. When a starter switch not illustrated is turned on whereby the electric current is supplied to the coil, the electromagnet switch 5 attracts the plunger 40 by the magnetic force that generates in the coil. As a result, by the swing operation of the lever 90 through a joint 40*a* that is provided on a forward end of the plunger 40, the electromagnet switch 5 generates a force of pushing the pinion moving member 4 forward. Further, even when the pinion moving member 4 that has been pushed forward abuts against the ring gear 8 and has its advance movement thereby restricted, the lever 90 itself is flexed with the result that the plunger 40 is attracted whereby it is possible to close motor contacts (not illustrated) that is provided inside the switch 5. It is to be noted that since the magnetic force of the coil attracting the plunger 40 disappears when supply of the electric current to the coil is stopped, the plunger 40 that has been attracted is returned to its initial position (the position illustrated in FIG. 1) by a return spring not illustrated.

The lever 90 has one end that is connected to the joint 40*a* and the other end that is engaged with an outer ring 91*a* from right and left sides of the ball bearing 91 (FIGS. 2 and 3), whereby the lever 90 is provided so as to be swingable about a pin 93 as a fulcrum that is supported by the front casing 10.

By its inner ring 91*b* being fitted over the outer peripheral surface of the hollow cylindrical member 70, the ball bearing 91 is provided so as to be slidable (between the position at which a forward end surface of the ball bearing 91 abuts on a rearward end surface of the pinion moving member 4 and the position at which a rearward end surface of the ball bearing 91 abuts on a snap ring 94 that is mounted on the rearward end portion of the hollow cylindrical member 70) on and along the outer peripheral surface of the hollow cylindrical member 70 in the axial direction thereof. In the inner peripheral surface of the inner ring 91*b* of the ball bearing 91, from the pinion moving member 4 side end surface thereof to an intermediate position thereof as viewed in the axial direction thereof, there is formed a recess 91*c* which is intended, when the pinion moving member 4 is located at its rest position (FIG. 1), to retain the outer peripheral portion of the ball 81 that protrudes from the outer peripheral surface of the hollow cylindrical member 70. Also, in the outer peripheral surface of the outer ring 91*a*, there is formed a groove 91*d* over an entire circumference thereof, with which the other end of the lever 90 is engaged. It is to be noted that the ball bearing 91 not only forms a part of the pinion driving mechanism but also forms a part of the pinion disengagement restriction mechanism or pinion retreat restricting mechanism together with the hollow cylindrical member 70, ball 81 and stepped wall surface 3*c* of the output shaft 3.

The first embodiment operates as follows.

When the starter switch is turned on whereby electric current is supplied to the coil of the electromagnet switch 5, the plunger 40 is attracted by the magnetic force of the coil (moved to the right side in FIG. 1). When this plunger attraction force is transmitted to the ball bearing 91 through the lever 90, it is transmitted to the hollow cylindrical member 70 as the pinion pushing-forward force through the ball 81 that is retained by the recess 91*c* of the ball bearing 91 (inner ring 91*b*) and the opening 70*a* of the hollow cylindrical member 70. As a result, the pinion moving member 4 that is integrated with the hollow cylindrical member 70 is caused to advance on the output shaft 3 along the helical spline *3b* together with the hollow cylindrical member 70.

When the pinion moving member 4 that has advanced on the output shaft 3 abuts against the ring gear 8, the motor contacts inside the electromagnet switch 5 is closed whereby electric current is supplied to the armature 16, with the result that the rotating force generates in the armature 16. By the rotating force of this armature 16 being transmitted to the output shaft 3 through the planetary gear reduction mechanism and one-way clutch, the output shaft 3 rotates. As a result, the pinion moving member 4 that has come into abutment with the ring gear 8 rotates and intermeshes with the ring gear 8 through its teeth traces coming into coincidence with the teeth traces thereof.

Figure 2:
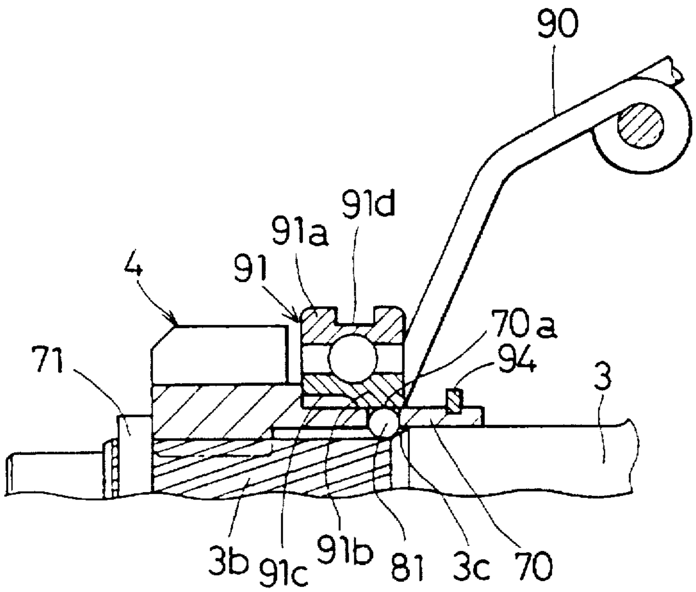
FIG. 2 is a partial sectional view illustrating a pinion disengagement restriction mechanism used in the starter shown in FIG. 1.
Figure 3:
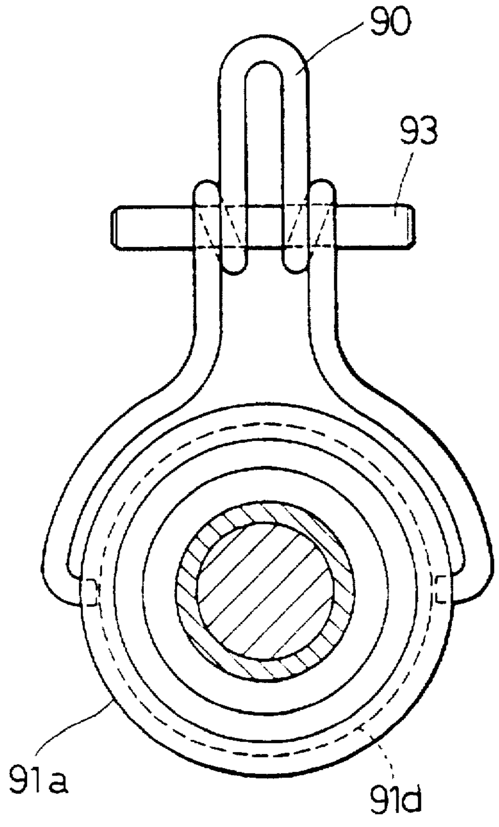
FIG. 3 is a front view illustrating a lever and a ball bearing used to drive a pinion in the starter shown in FIG. 1.

The the ball 81 drops onto the terminal end portion of the helical spline *3b* in synchronism with this intermeshing engagement of the pinion moving member 4 with the ring gear 8. Since the engagement between the ball 81 and the recess 91*c* formed in the inner ring 91*b* of the ball bearing 91 is released, the ball bearing 91 that is kept receiving the pinion pushing-forward force further advances on and along the outer peripheral surface of the hollow cylindrical surface until it abuts against the rearward end surface of the pinion gear 7 and stops. At this time, as illustrated in FIG. 2, the open surface of the opening 70*a* that is formed in the hollow cylindrical member 70 is closed by the inner peripheral surface of the inner ring 91*b*. Therefore, it is possible to restrict the ball 81 that is allowed to drop on the terminal end portion of the helical spline *3b* from popping out from the opening 70*a*. As a result, when the force of retreating the pinion moving member 4 acts thereon through the ring gear 8 after the start of the engine, since the retreat movement of the hollow cylindrical member 70 is regulated by the stepped wall *3c* of the output shaft 3 through the ball 81, the retreat of the pinion moving member 4 is restricted thereafter.

When the electric current ceases to be supplied to the electromagnet switch 5 after the start of the engine, the magnetic force of the coil disappears with the result that the plunger attraction force also disappears. As a result, the ball bearing 91 that has been pushed forward is returned through the lever 90. Here, when the recess 91*c* that is formed in the inner ring 91*b* is returned to the position coinciding with the open surface of the opening 70*a*, due to the centrifugal force of the hollow cylindrical force that rotates at high speeds the ball 81 is drawn off from the terminal end portion of the helical spline *3b* and thereby is received in the opening 70*a* and recess 91*c*. Since as a result of this the engagement of the ball 81 with the stepped wall surface *3c* is released, the retreat movement of the pinion moving member 4 becomes possible, with the result that the pinion moving member 4 can be returned to the rest position illustrated in FIG. 1.

As described above, the starter 1 of this embodiment is provided with the pinion disengagement restriction means on the pinion moving member side from the one-way clutch. That is, the ball 81 is received in the opening 70*a* of the hollow cylindrical member 70 that is provided integrally with the pinion moving member 4. For this reason, since after the start of the engine the hollow cylindrical member 70 also rotates at high speeds integrally with the pinion moving member 4 that is rotated by the ring gear 8, if the ball bearing 91 is moved whereby the ball 81 can pop out, the centrifugal force resulting from the high speed rotation of the hollow cylindrical member 70 acts on the ball 81, with the result that the ball 81 can reliably be released from the terminal end portion of the helical spline *3b*. As a result of this, after the engine is started, the pinion moving member 4 can retreat on the output shaft 3 along the helical spline *3b* and thus can be returned to its rest position.

Also, since it is structurally arranged to move the pinion moving member 4 through the ball bearing 91, when the hollow cylindrical member 70 has rotated jointly with the pinion moving member 4, the inner ring 91*b* and outer ring 91*a* of the ball bearing 91*a*1 rotate relative to each other. That is, after the engine is started, even when the inner ring 91*b* that is fitted over the outer periphery of the hollow cylindrical member 70 rotates at high speeds, the outer ring 91*a* can be kept out of rotation. Therefore, no slide friction occurs between the outer ring 91*a* and the lever 90. Therefore, since it is sufficient for the lever 90 merely to have only a rigidity high enough to advance and retreat the pinion moving member 4 through the ball bearing 91*a*, an inexpensive lever such as a wire material can be used as the lever 90.

Further, since the retreating force that acts on the pinion moving member 4 can be received by the stepped wall surface *3c* of the output shaft 3 through the ball 81, the necessity of forming a fitting hole in which the ball 81 is fitted in the output shaft 3 as in the prior art is eliminated.

Modifications of First Embodiment

Although in the present embodiment it has been arranged, when the pinion moving member 4 has been meshed with the ring gear 8, for the ball 81 to drop onto the terminal end portion of the helical spline *3b*, i.e., the stepped wall surface *3c*, it may be arranged to form in the output shaft 3 the fitting hole in which the ball 81 is fitted.

Second Embodiment

Figure 4:
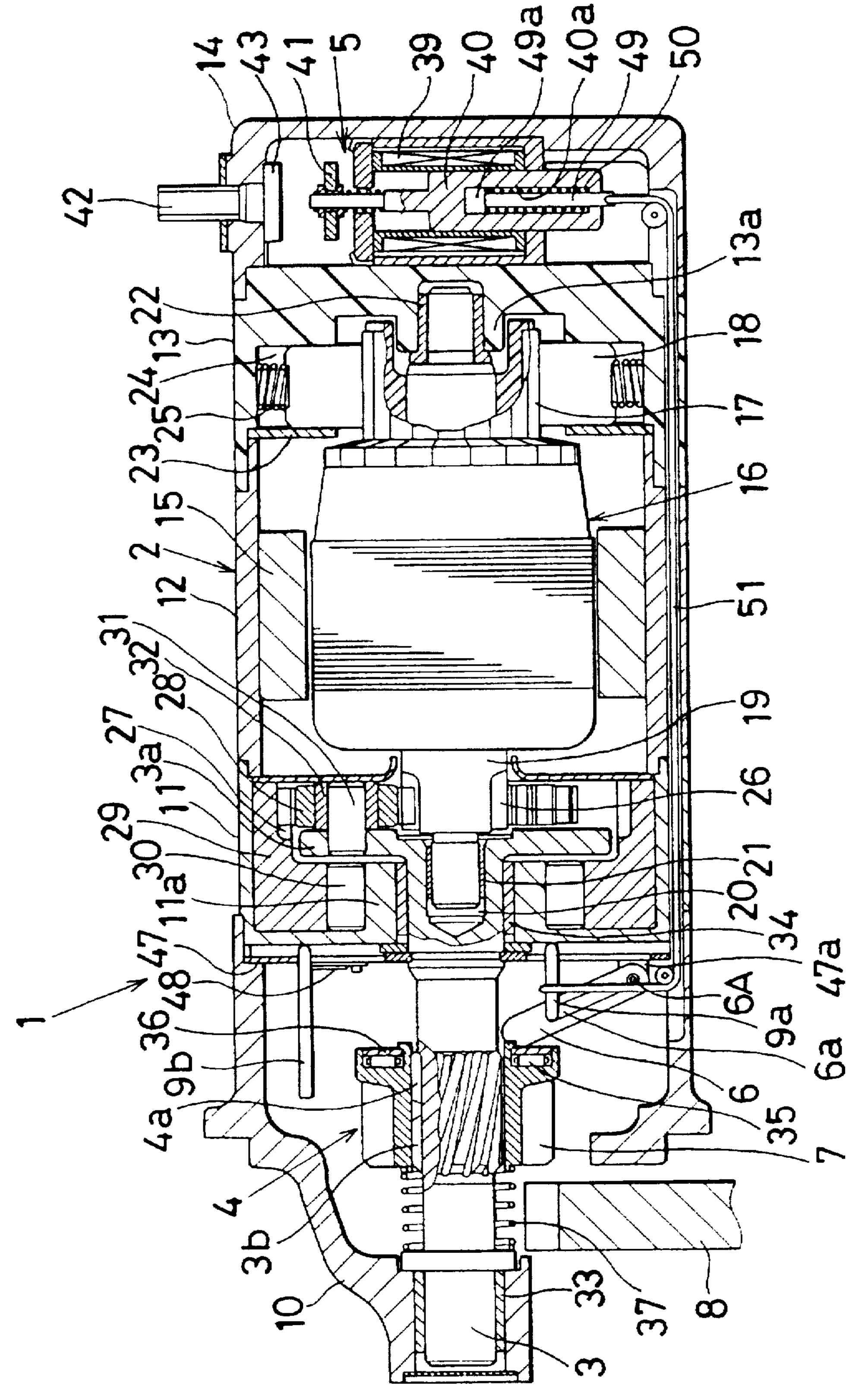
FIG. 4 is a cross sectional view of a starter according to the second embodiment of the present invention.

A starter 1 according to the second embodiment comprises, as shown in FIG. 4, an electric starting motor 2 which produces rotating force, a planetary gear speed reduction mechanism (described later) which speed-reduces rotation of the starting motor 2, an output shaft 3 which rotates upon receipt of rotary output of the reduction mechanism, a pinion moving member 4 fitted on the output shaft 3, an electromagnet switch 5 which controls power supply to the starting motor 2, a pinion pushing lever 6 as a part of a pinion driving mechanism which pushes forward in response to transmission of operational force of the magnet switch 5 thereto, a pinion retreat restricting member 9 (FIG. 6) which restricts retreat of a pinion gear 7 after meshing of the pinion gear 7 with a ring gear 8, a housing accommodating those constructional parts, and the like. The housing includes a front casing 10, a center casing 11, a yoke 12, a brush holder 13 and a rear casing 14, and is constructed generally cylindrically.

In the starting motor 2, fixed magnetic poles (plural permanent magnets) 15 are fixed to the inner periphery of the yoke 12 which functions as a magnetic casing as well as a part of the housing. An armature 16 is disposed rotatably in the inner periphery of the fixed magnetic poles 15, and brushes 18 are disposed on a commutator 17 attached to one axial end portion of the armature 16.

The yoke 12 shaped cylindrically is spigot-joint fitted at one axial end thereof with an axial opening end of the center casing 11 and at the other axial end thereof with an axial opening end of the brush holder 13. In the armature 16, one end of the rotary shaft 19 is inserted into a recess 20 formed in the other end of the output shaft 3 to be supported rotatably via a bearing 21 fitted into the inner periphery of the recess 20, while the other end of the same is supported rotatably via a bearing 22 held in a bearing portion 13*a* of the brush holder 13. The commutator 17 is constructed by disposing a plurality of commutator pieces cylindrically on the outer periphery of the other end of the rotary shaft 19. The brushes 18 are disposed in brush holding chambers 24 formed in a box-shape by the brush holder 13 and a plate 23, and are biased toward the outer periphery of the commutator 17 by brush springs 25, respectively. Each brush 18 is held slidably in the radial direction (vertically in FIG. 3) in the brush holding chamber 24 but is restricted to move in the rotation direction.

The reduction mechanism comprises a sun gear (external gear) 26 formed on the outer periphery of one end of the rotary shaft 19, an internal gear (internal gear) 27 positioned radially outside of the sun gear 26, and a plurality of planetary gears 28 interposed between the sun gear 26 and the internal gear 27 in meshing engagement therewith.

The internal gear 27 is formed on the inner periphery of a gear forming member 29 disposed on the inner periphery of the center casing 11. The gear forming member 29 constitutes an outer member of a one-way clutch together with an inner cylindrical part 11*a* constituting a clutch inner member and rollers 30, with the rollers 30 being interposed between the member 29 and the inner cylindrical part 11*a*. By the one-way clutch, the gear forming member 29 is provided unrotatably relative to the center casing 11 in the rotation direction of the armature 16 but rotatably in the counter-rotation direction of the armature 16. The planetary gears 28 are supported rotatably by bearings 32 fitted on the outer periphery of pins 31, respectively, which are press-fitted into a radially enlarged part 3*a* formed integrally on the outer periphery of the other end of the output shaft 3.

The output shaft 3 is disposed coaxially with the rotary shaft 19. One end of the shaft 3 is supported rotatably via a bearing 33 held by the front casing 10, while the other end of the same is supported rotatably via a bearing 34 held by the inner cylindrical part 11*a* of the center casing 11. Thus the output shaft 3 is restricted from moving in the axial direction. A helical spline 3*b* is formed on the outer periphery of the output shaft 3 extending forwardly (left direction in FIG. 4) so that the helical spline 3*b* is fitted with a helical spline 4*a* formed on the inner periphery of the pinion moving member 4.

The pinion moving member 4 is formed integrally with a pinion gear 7 which is engageable with a ring gear 8 of an engine. The pinion moving member 4 has a washer 36 disposed rotatably via rollers 35 at the rear side (right side in FIG. 4) of the pinion gear 7.

The pinion moving member 4 is held axially movably on the output shaft 3 by way of meshing engagement between the helical spline 3*b* of the output shaft 3 and the helical spline 4*a* of the pinion moving member 4, and normally biased rearwardly (in the opposite direction from the ring gear 8) by a return spring 37 disposed in front of the pinion gear 7.

The electromagnet switch 5 is disposed at the rear end (axially rearward of the brush holder 13) of the starter 1 and fixed in the inner periphery of the rear casing 14 formed in a bowl shape.

The electromagnet switch 5 has an attraction coil 39 which is energized by the closure or turn-on of a key switch 38 (FIG. 8), and a plunger 40 disposed movably in the inner periphery of the attraction coil 39, so that the plunger 40 opens (turns off) and closes (turns on) by the movement thereof motor contacts (described later) provided in a power supply circuit M (FIG. 8) for the starting motor 2. The attraction coil 39 and the plunger 40 are so arranged that the plunger 40 moves in the radial direction of the rear casing 14 (vertically in FIG. 4).

Figure 8:
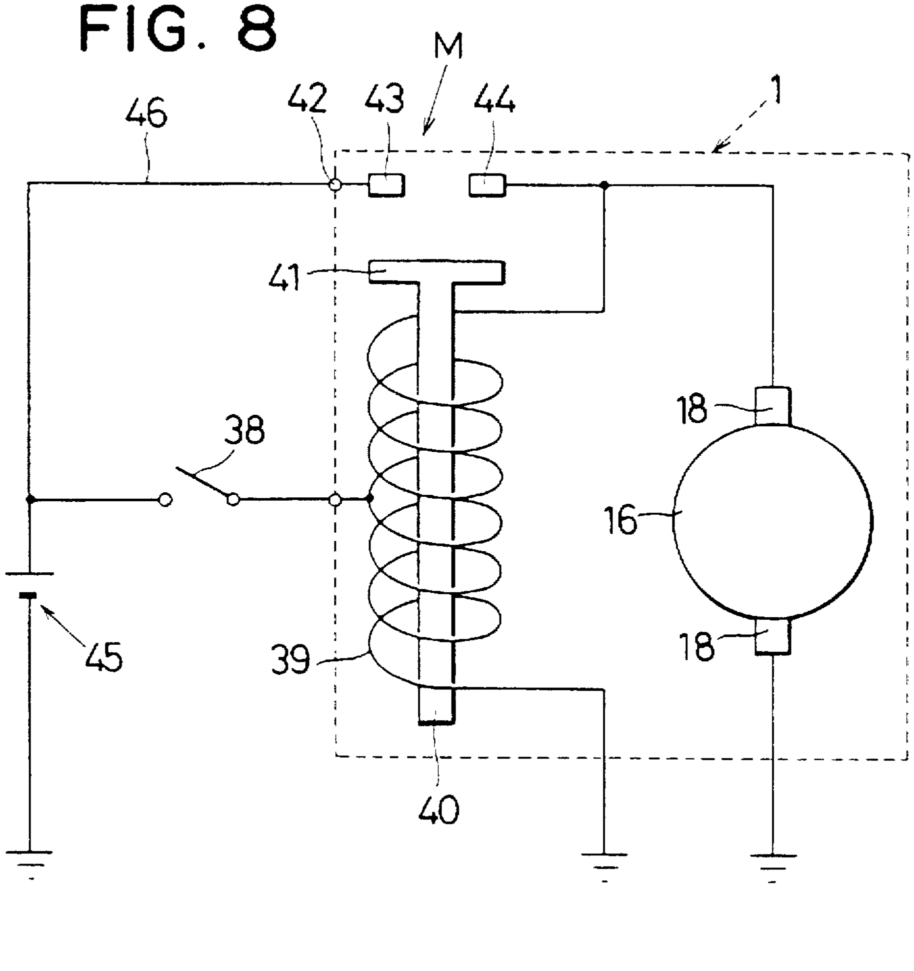
FIG. 8 is a wiring diagram of a power supply circuit for a starting motor shown in FIG. 4.

As shown in FIG. 8, the motor contacts includes a movable contact 41 attached to the upper end of the plunger 40, a battery-side fixed contact 43 provided integrally with a battery terminal 42 fixed to the rear casing 14, and a motor-side contact 44 connected to the brush 18 (positive polarity side), so that when the plunger 40 is attracted to move upwardly in FIG. 4, the movable contact 41 comes into contact with the fixed contacts 43 and 44 to connect the fixed contacts 43 and 44. The battery terminal 42 connects to an electric cable 46 directly connected to a battery 45 so that electric power is supplied from the battery 45.

Figure 5:
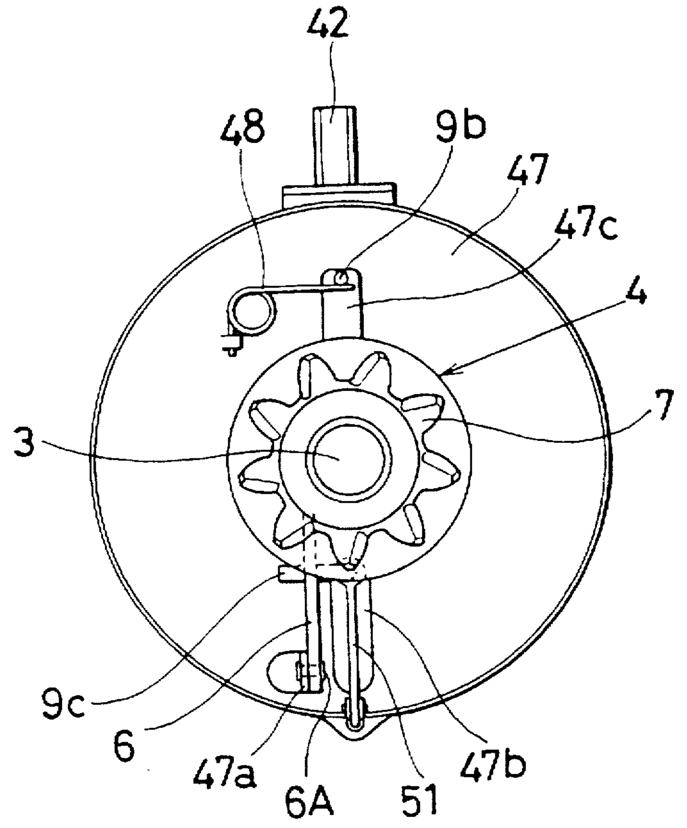
FIG. 5 is a front view of the starter shown in FIG. 4 and viewed from the front side under the condition that a front casing is removed.

The pinion pushing lever 6 has one end which is supported by a protrusion 47*a* of a plate 47 fixedly disposed in front of the center casing 11 and rotatably around a fulcrum 6A, and the other end which is held in abutment with the washer 36 disposed at the rear of the pinion moving member 4 and in inclined condition (FIG. 4). The pinion pushing member 6 is formed with a longitudinal groove 6*a* with which a free end 9*c* of lower protrusion 9*a* provided on the pinion retreat restricting member 9 is engaged (FIG. 5). The pinion pushing lever 6 is capable of pushing the pinion moving member 4 forwardly by rotating around the fulcrum 6A (rotating in the counterclockwise direction in FIG. 4), with the free end 9*c* of the lower protrusion 9*a* being engaged with the groove 6*a*.

Figure 6:
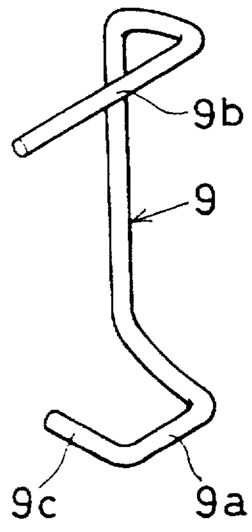
FIG. 6 is a perspective view of a pinion retreat restricting member of the starter shown in FIG. 4.

The pinion retreat restricting member 9 is made, as shown in FIG. 6, of a metallic rod member. The member 9 has the lower protrusion 9*a* and the upper protrusion 9*b* formed by bending both ends of the rod member in the same direction. The free end 9*c* of the lower protrusion 9*a* is bent further at the generally right angle relative to the lower protrusion 9*a*. The pinion retreat restricting member 9 is disposed in its entirety movably in the vertical direction in FIG. 4. That is, the part between the lower protrusion 9*a* and the upper protrusion 9*b* is disposed in a space formed between the front end surface of the center casing 11 and the plate 47, and both of the lower protrusion 9*a* and the upper protrusion 9*b* are extended forwardly of the plate 47 through openings 47*b* and 47*c* (FIG. 5) formed in the plate 47. The pinion retreat restricting member 9 is normally biased upwardly in FIG. 4 by reaction force of a spring member 48 (FIG. 5) which is fixed to the plate 47 and engaged with the upper protrusion 9*b*. The pinion retreat restricting member 9 is enabled to move downwardly in FIG. 4 against the reaction force of the spring member 48, when the operational force of the electromagnet switch 5 (movement of the plunger 40) is transmitted through a rod 49 provided in the plunger 40, a spring 50 and a cord-like member 51 connected to the rod 49.

The rod 49 is inserted into a longitudinal hole 40*a* formed inside of the plunger 40 through an opening formed on the bottom of the plunger 40 so that it may move vertically in the hole 40*a* along the inner periphery of the hole 40*a*.

The spring 50 is disposed axially with and outside of the rod 49 in the longitudinal hole 40*a*. The bottom end of the spring 50 is received by the inside bottom surface of the plunger 40, while the top end is received by a radially enlarged part 49*a* provided of the top end of the rod 49, so that the rod 49 is normally biased upwardly relative to the plunger 40.

The cord-like member 51 is connected at one end thereof to the bottom end of the rod 49 protruding downwardly from the opening of the plunger 40 and at the other end thereof to the lower protrusion 9*a* of the pinion retreat restricting member 9.

The starter of the second embodiment operates as follows.

When the key switch 38 is closed or turned on, electric current flows from the battery 45 to the attraction coil 39 of the electromagnet switch 5 which in turn generates magnetic force, so that the plunger 40 is attracted upwardly in FIG. 4 by the magnetic force. With the movement of the plunger 40, the rod 49 biased by the spring 50 moves together with the plunger 40. The cord-like member 51 connected to the rod 49 pulls down the pinion retreat restricting member 9 which in turn moves downward in FIG. 4 while flexing the spring 48. With downward movement of the pinion retreat restricting member 9, the free end 9*c* of the lower protrusion 9*a* moves downwardly along the groove 6*a* of the pinion pushing member 6 so that the pinion pushing lever 6 rotates around the fulcrum 6A in the counterclockwise direction in FIG. 4.

The rotation of the pinion pushing lever 6 pushes the pinion moving member 4 toward the ring gear 8 against the biasing force of the return spring 37. When the end face of the pinion gear 7 thus pushed abuts the end face of the ring gear 8 and the pinion moving member 4 stops moving, the pinion pushing lever 6 stops rotating. Because the downward movement of the pinion retreat restricting member 9 is restricted by the stopping of rotation of the pinion pushing lever 6, movement of the rod 49 connected to the pinion retreat restricting member 9 through the cord-like member 51 also stops. However, the plunger 40 in the electromagnet switch 5 which is kept attracted by the magnetic force of the attraction coil 39 moves further upwardly in FIG. 4 relative to the rod 49 while flexing the spring 50. With the movement of the plunger 40, the movable contact 41 provided at the top end of the plunger 40 abuts the fixed contacts 43 and 44 to close or turn on the same so that the armature 16 starts to rotate receiving the electric current from the battery 45.

The rotation of the armature 16 is reduced in speed by the reduction mechanism and then transmitted to the output shaft 3. When the pinion gear 7 moves or rotates to a position where the pinion gear 7 comes into meshing engagement with the ring gear 8 by the rotation of the output shaft 3, the pinion moving member 4 which has been restricted form moving forward until that time is enabled to move further axially so that the rod 49 is allowed to move upwardly in the hole 40*a* of the plunger 40 by the reaction force of the spring 50. The movement of the rod 49 causes the cord-like member 51 to move the pinion retreat restricting member 9 further downwardly. The pinion pushing lever 6 rotates further to push the pinion moving member 4 forward and, as a result, the pinion gear 7 meshes with the ring gear 8 so that the rotating force of the starting motor 2 is transmitted to the ring gear 8 without fail to start the engine.

Figure 7:
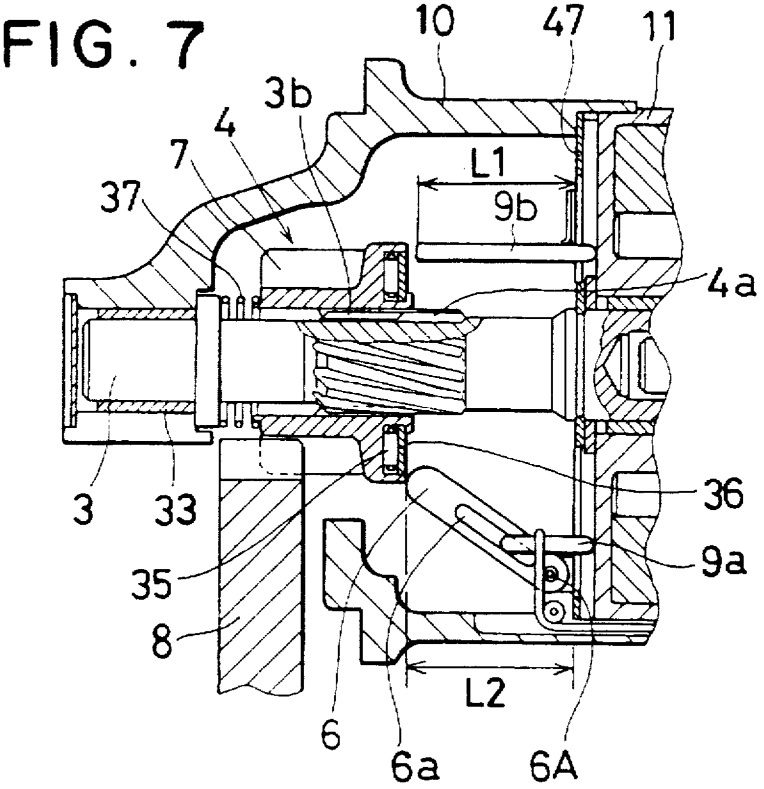
FIG. 7 is a cross sectional view of a main part of the starter shown in FIG. 4 under the condition in which a pinion gear is in meshing engagement with a ring gear.

As the plunger 40 of the electromagnet switch 5 moves further upward after the movable contact 41 has contacted the fixed contacts 43 and 44, the pinion retreat restricting member 9 is moved downward through the rod 49 and the cord-like member 51 to cause the upper protrusion 9*b* of the pinion retreat restricting member 9 to enter behind the pinion moving member 4 as shown in FIG. 7. Thus, even when the retreating force occurring with rotation variations caused at the time of starting the engine exerts on the pinion moving member 4, the pinion moving member 4 can be restricted from retreating by upper protrusion 9*b* having the free end face thereof being kept in abutment with the washer 36 of the pinion moving member 4. The distance L1 between the free end face of the upper protrusion 9*b* of the pinion retreat restricting member 9 and the end face of the plate 47 and the distance L2 between the top end of the lever 6 and the end face of the plate 47 at the time of the maximum inclination of the pinion pushing lever 6 are determined to satisfy the following relation so that the upper protrusion 9*b* is enabled to engage smoothly without any trouble at the time of meshing engagement of the pinion gear 7 and the ring gear 8.

$$L1 \leqq L2$$

When the key switch 38 is opened or turned off after engine starting, the electric current to the attraction coil 39 is interrupted and the attraction force for the plunger 40 disappears so that the pinion retreat restricting member 9 is returned upwardly by the reaction force of the spring 48. As the upper protrusion 9*b* of the pinion retreat restricting member 9 disengages from the washer 36 to release the retreat restriction on the pinion moving member 4, the pinion moving member 4 biased by the return spring 37 retreats rearwardly on the output shaft 3 to a rest position.

With the pinion retreat restricting member 9 being pushed back upwardly, the cord-like member 51 pulls downwardly the rod 49 and the plunger 40 of the electromagnet switch 5 moves downward together with the rod 49 to disengage the movable contact 41 from the fixed contacts 43 and 44. Thus, the electric current to the armature 16 is interrupted to stop rotation of the armature 16.

According to the second embodiment, even under the condition that the pinion retreating force occurring with the rotation variations caused at the time of engine starting exerts on the pinion moving member 4, the retreat of the pinion moving member 4 can be restricted by the upper protrusion 9*b* of the pinion retreat restricting member 9. That is, because the pinion pushing lever 6 to which the reaction force of the spring 50 is transmitted is not required to restrict the retreat of the pinion moving member 4, the spring 50 is required only to store the reaction force necessary for engaging the pinion gear 7 to the ring gear 8. Therefore, in comparison with the conventional starter in which the retreat of the pinion gear 7 is restricted by the loading of the engagement biasing spring, the loading of the spring 50 can be reduced greatly to reduce the size of the electromagnet switch 5.

According to the second embodiment, the reduction mechanism is provided to transmit the rotation of the starting motor 2 to the output shaft 3 after reducing the rotation speed. As a result, the pinion gear 7 starts to rotate more slowly than the starter having no reduction mechanism, thereby the loading of the spring 50 can be reduced more.

Although the constructional parts of the starter 1 are accommodated within the generally cylindrically-shaped housing in the second embodiment, the starter may be modified to a biaxial type in which the electromagnet switch 5 is disposed radially outside of the starting motor 2 (FIG. 1). In this modification as well, the loading of the spring 50 can be reduced to reduce the size of the electromagnet switch 5 by restricting the pinion moving member 4 in the similar manner.

Further, although the reduction mechanism is provided in the foregoing embodiments, the present invention may be applied as well to a starter having no such reduction mechanism. Further, the foregoing embodiments may be modified in other ways without departing from the scope and spirit of the invention.

What is claimed is:

1. A starter comprising:

a pinion moving member movably fitted onto an outer periphery of an output shaft through a helical spline;

pushing means for pushing the pinion moving member toward a ring gear of an engine; and pinion disengagement restriction means for, when the pinion moving member is moved toward the ring gear by the pushing means to mesh with the ring gear, restricting the pinion moving member from being disengaged from the ring gear, wherein the pinion disengagement restriction means includes, a hollow cylindrical member provided on the outer periphery of the output shaft and axially movable integrally with the pinion gear and rotatable, an engagement member retained by the hollow cylindrical member and provided radially movably, a retaining portion provided on the output shaft and engageable with the engagement member, when the hollow cylindrical member moves a prescribed distance, to thereby stop the retreat of the hollow cylindrical member, and a regulation member for regulating the radial movement of the engagement member, when the engagement member is engaged with the retaining portion, and thereby restricting the engagement member from being disengaged from the retaining portion, wherein:

the output shaft has a small diameter portion smaller in diameter than a large diameter portion over which the hollow cylindrical member is normally fitted;

the helical spline is provided on the small diameter portion;

the retaining portion is a stepped portion that extends from the large diameter portion to the small diameter portion; and the engagement member is engageable with stepped portion, and wherein:

the regulation member includes a ball bearing fitted over an outer peripheral surface of the hollow cylindrical member and is provided so as to be axially slidable on and along the outer peripheral surface of the follow cylindrical member; and the pushing means is adapted to move the pinion moving member through the ball bearing and includes a lever engaged with an outer ring of the ball bearing and an electromagnet switch that drives the ball baring through the lever.

2. A starter as in claim 1, wherein the pinion disengagement restriction means is provided separately from the pushing means.

3. A starter comprising:

a starting motor;

an output shaft having a stepped portion;

a pinion moving member movably fitted on the output shaft and having a cylindrical portion, the pinion moving member being engageable with an engine ring gear;

a gear reduction mechanism disposed to transmit a motor rotation in a reduced speed;

a one-way clutch axially fixed with respect to the starting motor and disposed to transmit the motor rotation in the reduced speed to the output shaft;

a pinion driving member engaged with the cylindrical portion to advance and return the pinion moving member for engagement with and disengagement from the ring gear, respectively;

a regulation member disposed radially movable between the pinion moving member and the output shaft to maintain engagement of the pinion moving member with the output shaft therethrough when moved to the stepped wall; and an electromagnet switch engaged with the pinion moving member to control movement of the pinion moving member, wherein:

the pinion driving member includes a flexible lever engaged with the electromagnet switch, an inner ring engaged with the cylindrical portion, an outer ring engaged with the flexible lever and a bearing ball disposed between the rings to cause only the inner member to rotate with the cylindrical member.

4. A starter as in claim 3, wherein said regulation member is provided separately from said pinion driving member.

5. A starter comprising:

a starting motor;

an output shaft having a stepped portion;

a pinion moving member movably fitted on the output shaft and having a cylindrical portion, the pinion moving member being engageable with an engine ring gear;

a gear reduction mechanism disposed to transmit a motor rotation in a reduced speed;

a one-way clutch axially fixed with respect to the starting motor and disposed to transmit the motor rotation in the reduced speed to the output shaft;

a pinion driving member engaged with the cylindrical portion to advance and return the pinion moving member for engagement with and disengagement from the ring gear, respectively;

a regulation member disposed radially movable between the pinion moving member and the output shaft to maintain engagement of the pinion moving member with the output shaft therethrough when moved to the stepped wall; and an electromagnet switch engaged with the pinion moving member to control movement of the pinion moving member, wherein:

the regulation member includes a regulating ball;

the cylindrical portion has an opening for receiving the regulating ball therein radially movably; and the pinion driving member has a recess at a radially inner side thereof facing the cylindrical portion for contacting the regulating ball to move the pinion moving member axially.

6. A starter comprising:

a starting motor;

an output shaft driven by the starting motor through a one-way clutch provided for transmitting a rotation in only one direction;

a pinion moving member movably fitted on the output shaft and engageable with an engine ring gear, the pinion moving member being movable in an axial direction relative to the one-way clutch;

an electromagnet switch;

a lever engaged with the electromagnet switch at one end thereof; and a ball bearing disposed to be driven by the electromagnet switch through the lever for advancing and returning the pinion moving member axially to and from the ring gear, the ball bearing including an inner ring engaged with the pinion moving member, an outer ring engaged with the lever and a bearing ball disposed between the rings to cause only the inner member to rotate with the pinion.

7. A starter as in claim 6, wherein a further comprising pinion retreat restricting means provided separately from the lever for restricting the pinion moving member from retreating after engagement with said engine ring gear.

8. A starter comprising:

a starting motor;

an output shaft driven by the starting motor;

a pinion moving member movably fitted on the output shaft and engageable with an engine ring gear;

an electromagnet switch;

a link member engaged with the electromagnet switch at one end thereof; and a ball bearing disposed to be driven by the electromagnet switch through the link member for advancing and returning the pinion moving member axially toward and from the ring gear, the ball bearing including an inner ring disposed radially outside of the pinion moving member and engaged with the pinion moving member, an outer ring disposed radially outside of the inner ring and engaged with the link member and a bearing ball disposed between the rings to cause only the inner member to rotate with the pinion.

* * * * *